United States Patent
Zhang et al.

(10) Patent No.: US 12,416,738 B2
(45) Date of Patent: Sep. 16, 2025

(54) METHOD FOR ITERATIVE FIRST ARRIVAL PICKING USING GLOBAL PATH TRACING

(71) Applicant: SAUDI ARABIAN OIL COMPANY, Dhahran (SA)

(72) Inventors: Dongliang Zhang, Khobar (SA); Constantinos Tsingas, Dhahran (SA); Tong Wang Fei, Dhahran (SA); Mohammed S. Mubarak, Dhahran (SA); Hong Liang, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 480 days.

(21) Appl. No.: 17/959,214

(22) Filed: Oct. 3, 2022

(65) Prior Publication Data
US 2024/0118442 A1    Apr. 11, 2024

(51) Int. Cl.
*G01V 1/34*    (2006.01)
*E21B 7/04*    (2006.01)
(Continued)

(52) U.S. Cl.
CPC ............... *G01V 1/345* (2013.01); *E21B 7/04* (2013.01); *E21B 44/00* (2013.01);
(Continued)

(58) Field of Classification Search
None
See application file for complete search history.

(56) References Cited

U.S. PATENT DOCUMENTS

| 6,189,611 B1 | 2/2001 | Kasevich |
| 7,423,930 B2 | 9/2008 | Valero et al. |

(Continued)

FOREIGN PATENT DOCUMENTS

| CN | 103225497 B | 7/2015 | |
| CN | 105425286 A | * 3/2016 | ............. G01V 1/282 |

(Continued)

OTHER PUBLICATIONS

CN105425286A translation (Year: 2016).*
(Continued)

*Primary Examiner* — Lina Cordero
(74) *Attorney, Agent, or Firm* — Osha Bergman Watanabe & Burton LLP

(57) ABSTRACT

Systems and methods for automated first arrival picking are disclosed. The method includes obtaining a seismic dataset composed of a plurality of seismic gathers and determining a pilot for each gather, where the pilot includes a position on an ordinate axis for each seismic trace representing a first arrival. The method continues iteratively until a stopping criterion is met by creating a preconditioned gather using the pilot, determining a differential pilot using global path tracing subject to a constraint and incrementing the pilot using the differential pilot to create a total picked first arrival. Once the stopping criterion has been met, the method further includes determining a final picked first arrival based on the total picked first arrival, determining a seismic velocity model from the final picked first arrival using a tomographic inversion and creating a seismic image using the seismic velocity model and the seismic dataset.

20 Claims, 7 Drawing Sheets

(51) Int. Cl.
  *E21B 44/00* (2006.01)
  *E21B 47/0224* (2012.01)
  *G01V 1/28* (2006.01)
  *G01V 1/30* (2006.01)

(52) U.S. Cl.
  CPC .......... *E21B 47/0224* (2020.05); *G01V 1/282* (2013.01); *G01V 1/303* (2013.01); *E21B 2200/20* (2020.05); *G01V 2210/1295* (2013.01); *G01V 2210/1425* (2013.01); *G01V 2210/622* (2013.01); *G01V 2210/65* (2013.01); *G01V 2210/74* (2013.01)

(56) References Cited

U.S. PATENT DOCUMENTS

| | | | |
|---|---|---|---|
| 8,720,550 | B2 | 5/2014 | Banerjee et al. |
| 10,067,255 | B2 | 9/2018 | Colombo et al. |
| 10,852,450 | B2 | 12/2020 | Colombo et al. |
| 11,187,066 | B2 | 11/2021 | Aljindan et al. |
| 11,467,299 | B2 * | 10/2022 | Kim .................. G01V 1/282 |
| 2005/0128872 | A1 * | 6/2005 | Valero .................. G01V 1/48 367/34 |
| 2011/0096626 | A1 * | 4/2011 | Zhu .................. G01V 1/288 367/38 |
| 2014/0219054 | A1 | 8/2014 | Mousa et al. |
| 2014/0278120 | A1 | 9/2014 | Kahn et al. |
| 2014/0352973 | A1 | 12/2014 | Dwars |
| 2019/0293816 | A1 | 9/2019 | Yoo et al. |
| 2019/0302298 | A1 | 10/2019 | Colombo et al. |
| 2019/0324167 | A1 | 10/2019 | Zhang |

FOREIGN PATENT DOCUMENTS

| | | |
|---|---|---|
| CN | 106054251 A | 10/2016 |
| CN | 107272066 B | 1/2019 |
| CN | 109143367 A | 1/2019 |
| CN | 111060966 A | 4/2020 |
| CN | 109917457 B | 12/2020 |
| CN | 111538086 B | 8/2021 |
| WO | 2011056551 A1 | 5/2011 |

OTHER PUBLICATIONS

Hale, Dave, "Dynamic warping of seismic images", Geophysics, vol. 78, No. 2, pp. S105-S115, 2013 (11 pages).
Zhang, Dongliang et al., "Automatic First Arrival Picking Workflow by Global Path Tracing," Geophysics, vol. 87, No. 1, 2021 (13 pages).
Colombo, Daniele, et al., "Fully automated near-surface analysis by surface-consistent refraction method," Geophysics, 2016 (11 pages).
Wu, Xinming, et al., "Fast salt boundary interpretation with optimal path picking," Geophysics, 2018 (9 pages).
McCormack, Michael D et al., "First-break refraction event picking and seismic data trace editing using neural networks," Geophysics, 1993 (12 pages).
Xu, Yinpo, et al., "A high accurate automated first-break picking method for seismic records from high-density acquisition in areas with a complex surface," Geophysical Prospecting, 2020 (25 pages).
Ormat Technologies, "Wister 2013 3D Seismic Processing Report," CGG Subsurface Technologies, 2014 (35 pages).
Chu, Chung-Kuang P., et al., "First Break Refraction Event Picking Using Fuzzy Logic Systems," IEEE Transactions on Fuzzy Systems, 1994 (12 pages).
Akram, Jubran, et al., "A review and appraisal of arrival-time picking methods for downhole microseismic data," Geophysics, 2016 (21 pages).
Zhang, Dongliang, et al., "Automatic traveltime picking by global path tracing," Paper presented at the SEG/AAPG/SEPM First International Meeting for Applied Geoscience & Energy, Denver, Colorado, USA and online, Sep. 2021 (5 pages).

* cited by examiner

METHOD FOR ITERATIVE FIRST ARRIVAL PICKING USING GLOBAL PATH TRACING

BACKGROUND

Seismic surveys are frequently conducted by participants in the oil and gas industry. Seismic surveys are conducted over subsurface regions of interest during the search for, and characterization of, hydrocarbon reservoirs. In seismic surveys, a seismic source generates seismic waves that propagate through the subterranean region of interest and are detected by seismic receivers. The seismic receivers detect and store a time-series of samples of earth motion caused by the seismic waves. The collection of time-series of samples recorded at many receiver locations generated by a seismic source at many source locations constitutes a seismic dataset.

To determine earth structure, including the presence of hydrocarbons, the seismic dataset may be processed. Processing a seismic dataset includes a sequence of steps designed to correct for near-surface effects, attenuate noise, compensate for irregularities in the seismic survey geometry, calculate a seismic velocity model, image reflectors in the subterranean, and calculate a plurality of seismic attributes to characterize the subterranean region of interest and determine drilling targets. Critical steps in processing seismic data include determining first arrivals. First arrival picking is the identification of the time at which the first seismic wave is detected at a receiver or the "first arrival travel time" of the first arriving event. A tomographic inversion may be performed to incrementally modify the seismic velocity model to minimize the misfits between predicted and observed first arrivals. A seismic image may then be determined for the subterranean region of interest by performing a seismic migration, in which seismic events are re-located in either space or time to their true subsurface positions using a seismic dataset and the modified seismic velocity model. A properly processed seismic dataset may aid in decisions concerning if, and where, to drill for hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for automated first arrival picking on a seismic dataset. The method includes obtaining a seismic dataset for a subterranean region of interest composed of a plurality of seismic gathers and determining a pilot for each seismic gather. The method further includes determining a pilot for each seismic gather, where the pilot includes a position on an ordinate axis for each seismic trace within the seismic gather representing a first arrival location. The method continues iteratively until a stopping criterion is met by creating a preconditioned gather using the pilot, determining a differential pilot using global path tracing subject to a constraint and incrementing the pilot using the differential pilot to create a total picked first arrival. The total picked first arrival is evaluated for the stopping criterion and once satisfied, the method further includes determining a final picked first arrival based on the total picked first arrival, determining a seismic velocity model from the final picked first arrival using a tomographic inversion and creating a seismic image for the subterranean region of interest using the seismic velocity model and the seismic dataset.

In general, in one aspect, embodiments relate to a system that includes a seismic survey system configured to acquire a seismic dataset for a subterranean region of interest, a seismic processor and a seismic interpretation workstation. The seismic processor from the system is configured to receive the seismic dataset composed of a plurality of seismic gathers from the seismic acquisition system and determine a pilot for each seismic gather. The seismic processor is further configured further to determine a pilot for each seismic gather, where the pilot includes a position on an ordinate axis for each seismic trace within the seismic gather representing a first arrival location. The seismic processor is configured further to perform iteratively until a stopping criterion is met, to create a preconditioned gather using the pilot, determine a differential pilot using global path tracing subject to a constraint and increment the pilot using the differential pilot to create a total picked first arrival. The seismic processor is configured further to evaluate the total picked first arrival for the stopping criterion and once satisfied, determine a final picked first arrival based on the total picked first arrival, determine a seismic velocity model from the final picked first arrival using a tomographic inversion and create a seismic image for the subterranean region of interest using the seismic velocity model and the seismic dataset. The system also includes a seismic interpretation workstation configured to identify a drilling target within the subterranean region of interest based on the seismic image.

In general, in one aspect, embodiments relate to a non-transitory computer readable memory having computer-executable instructions stored thereon that, when executed by a processor, perform steps for automated first arrival picking on a seismic dataset. The instructions include obtaining a seismic dataset for a subterranean region of interest composed of a plurality of seismic gathers and determining a pilot for each seismic gather. The instructions further include determining a pilot for each seismic gather, where the pilot includes a position on an ordinate axis for each seismic trace within the seismic gather representing a first arrival location. The instructions continue iteratively until a stopping criterion is met by creating a preconditioned gather using the pilot, determining a differential pilot using global path tracing subject to a constraint and incrementing the pilot using the differential pilot to create a total picked first arrival. The total picked first arrival is evaluated for the stopping criterion and once satisfied, the instructions further include determining a final picked first arrival based on the total picked first arrival, determining a seismic velocity model from the final picked first arrival using a tomographic inversion and creating a seismic image for the subterranean region of interest using the seismic velocity model and the seismic dataset.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
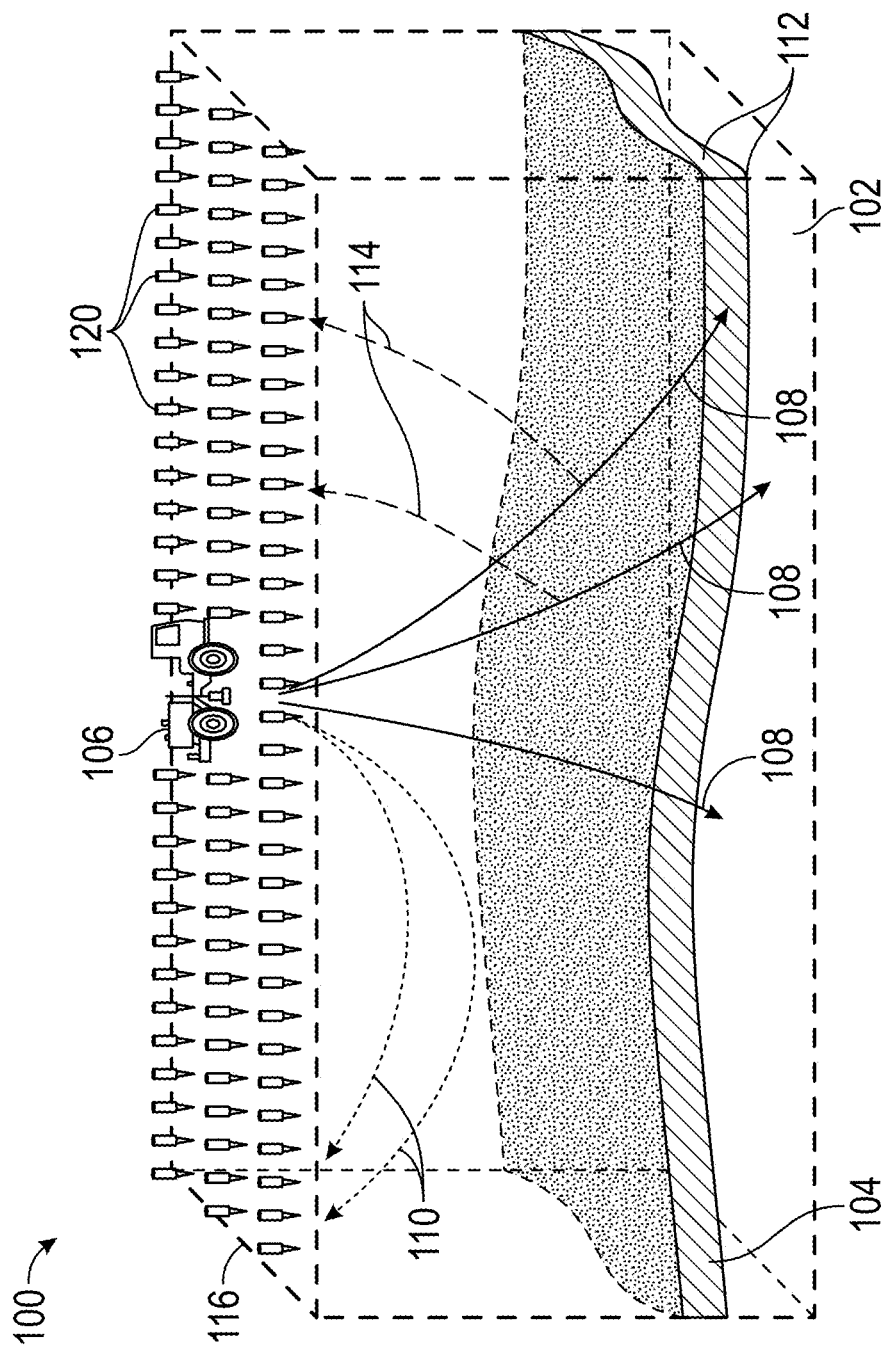
FIG. 1 depicts a seismic survey system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic dataset" includes reference to one or more such seismic datasets.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended.

Seismic data may be composed of a plurality of seismic traces. For example, a seismic trace may include a series of samples spaced at regular intervals along an ordinate axis. In some embodiments, the ordinate axis may represent time (measured from the activation of a seismic source) and each sample may contain a measurement of ground vibration caused by a seismic wave at the corresponding time. In other embodiments, the ordinate axis may represent depth (measured from a datum that may be a point on the surface of the earth, or mean sea-level) and each sample may contain an estimate of seismic wave reflection amplitude at the corresponding depth).

In some embodiments, first arrival picking, or "first break picking" may involve the identification of the time at which the first seismic wave is detected at a receiver or the "first arrival travel time" of the first arriving event. Those ordinary skilled in the art frequently use the terms "first break" and "first arrival" interchangeably. Herein, for clarity we will use the term first arrival. First arrival picking may be performed on recorded seismic data. First arrival picking may also be performed on simulated, modeled, or synthetic wavefields such as those used in full wavefield travel-time inversion (FWTI). First arrival picks may be used to estimate and compensate for statics corrections or may be used in tomographic inversion to update a seismic velocity model.

The terms "seismic velocity model," "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which is ray paths obeying Snell's law can be traced.

A seismic velocity model represents the seismic velocity or the speed with which a seismic wave propagates through a subsurface material. Different subsurface materials may exhibit different seismic velocities. A seismic velocity model may be determined from a seismic dataset using a variety of methods, known to a person of ordinary skill in the art, collectively called "velocity analysis" or "migration velocity analysis (MVA)".

A geological model is a numerical representation of the spatial distribution of rocks and rock types, e.g., sandstone, limestone, shale, in the subsurface.

Seismic noise may be any unwanted recorded energy that is present in a seismic dataset. Seismic noise may be random or coherent and its removal, or "denoising," is desirable in order to improve the accuracy and resolution of the seismic image. For example, seismic noise may include, without limitation, swell, wind, traffic, seismic interference, mud roll and ground roll.

The embodiments disclosed herein describe methods and systems for automated first arrival picking on a seismic dataset using global path tracing with an iterative pilot. The methods include determining a pilot for each seismic gather in the seismic dataset. The pilot includes a position on an ordinate axis for each seismic trace within a seismic gather and represents an estimated first arrival pick. The method does not require an accurate pilot to begin and a constant traveltime may be used. The method continues iteratively until a stopping criterion is met by creating a preconditioned gather by shifting one of the plurality of seismic traces from the seismic gather along the ordinate axis by a shift determined from the pilot. A differential pilot is then determined from the preconditioned gather by using global path tracing subject to a constraint. In global path tracing, a path of maximum accumulated amplitude or the differential pilot is selected that represents the calculated first arrival locations. The pilot is incremented using the differential pilot to create a total picked first arrival.

At this stage of the method, the total picked first arrival is evaluated for the stoppage criterion to determine a final picked first arrival. If the total picked first arrival does not meet the stopping criterion and the total picked first arrival is used as a new pilot for an additional loop to repeat the method until the stopping criterion is met. Once the total picked first arrival satisfies the stopping criterion, the total picked first arrival is saved and output as the final picked first arrival. A seismic velocity model is determined from the final picked first arrival by using a tomographic inversion. A seismic image for the subterranean region of interest is created using the seismic velocity model and the seismic dataset. A drilling target may be determined based on the interpretation of the seismic image using a seismic interpretation workstation and a wellbore path may be planned, using a wellbore path planning system, to intersect the drilling target. A wellbore may be drilled guided by the wellbore path, using a drilling system, in accordance with one or more embodiments. Often in seismic data processing, an accurate initial pilot is imperative for determining accurate first arrival picks. The method uses an iterative pilot creation approach which avoids being reliant on having an accurate initial pilot available.

FIG. 1 shows a seismic survey (100) of a subterranean region of interest (102), which may contain a reservoir (104). The seismic survey (100) may utilize a seismic source (106) on the surface of the earth (116) that generates radiated seismic waves (108). The radiated seismic waves (108) may return to the surface as refracted seismic waves (110) or may be reflected by geological discontinuities (112) and return to the surface as reflected seismic waves (114). At the surface, the refracted seismic waves (110) and reflected seismic waves (114) may be detected by seismic receivers (120).

In some embodiments, the refracted seismic waves (110) and reflected seismic waves (114) generated by a single activation of the seismic source (106) are recorded by a seismic receiver (120) as a time-series representing the amplitude of ground-motion at a sequence of discreet times. This time-series may be denoted a seismic "trace". The seismic receivers (120) are positioned at a plurality of seismic receiver locations that we may denote $(x_r, y_r)$ where x and y represent orthogonal axes on the surface of the earth (116) above the subterranean region of interest (102). Thus, the refracted seismic waves (110) and reflected seismic waves (114) generated by a single activation of the seismic source (106) may be represented as a three-dimensional "3D" volume with axes $(x_r, y_r, t)$ where $(x_r, y_r)$ represents the location of the seismic receiver (120) and t delimits the time sample at which the amplitude of ground-motion was measured.

A seismic survey (100) also may include recordings of seismic waves generated by a seismic source (106) that is positioned at a plurality of seismic source locations denoted $(x_s, y_s)$. Thus, all the data acquired by a seismic survey (100) may be represented as a five-dimensional volume, with coordinate axes $(x_s, y_s, x_r, y_r, t)$ and denoted a "seismic dataset".

A seismic dataset must be processed to generate a seismic velocity model of the subterranean region of interest (102) or an image of seismic reflectors within the subterranean region of interest (102). The seismic reflectors may be geological boundaries, such as the boundaries between geological layers, the boundaries between different pore fluids, faults, fractures or groups of fractures within the rock.

Processing a seismic dataset includes a sequence of steps designed, without limitation, to do one or more of the following: correct for near surface effects; attenuate noise; compensate for irregularities in the seismic survey geometry; calculate a seismic velocity model; image reflectors in the subsurface; and calculate a plurality of seismic attributes to characterize the subterranean region of interest (102). The resulting seismic image of seismic attributes may aid in making decisions governing where to drill for hydrocarbons. Processing a seismic dataset may also include determining a set of first arrival picks to be used for a tomographic inversion. Starting from a prior model, tomographic inversion may incrementally modify the seismic velocity model such that the misfits between predicted and observed first-breaks are minimized. A seismic image may then be determined for the subterranean region of interest by performing a seismic migration, in which seismic events are re-located in either space or time to their true subsurface positions using a seismic dataset and the modified seismic velocity model.

Figure 2:
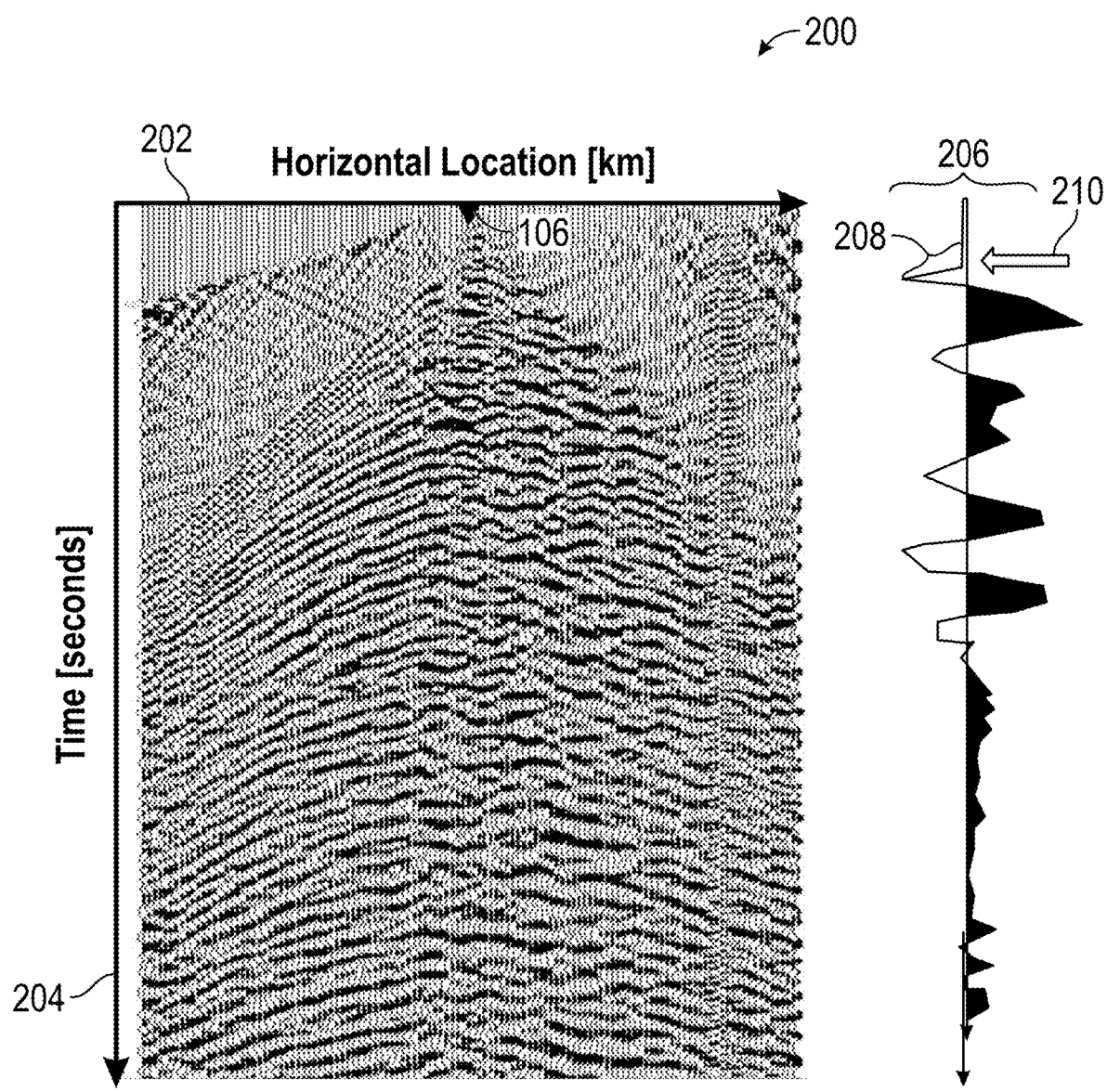
FIG. 2 shows seismic data in accordance with one or more embodiments.
Figure 3:
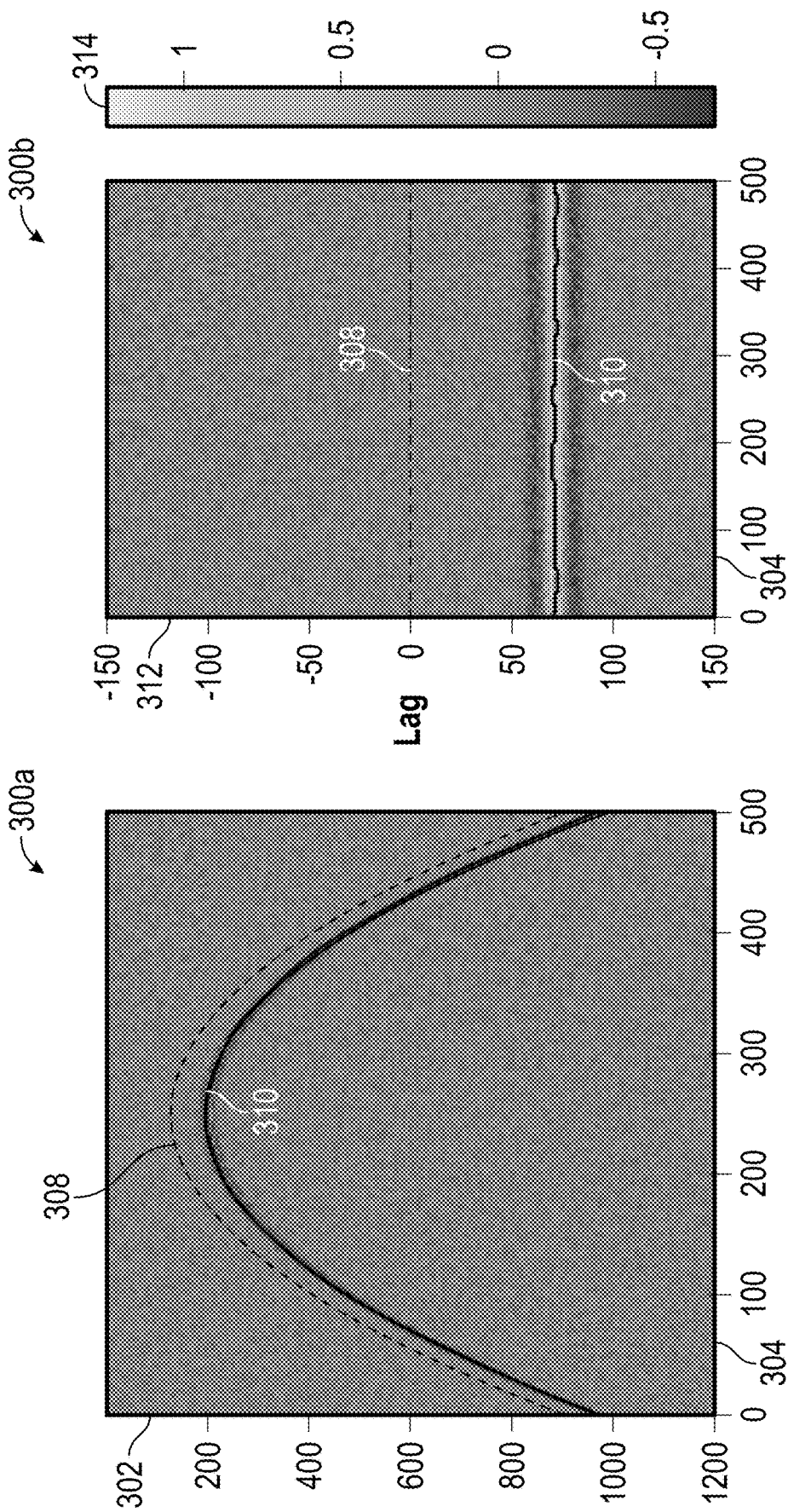
FIGS. 3A-3B show seismic gathers in accordance with one or more embodiments.

FIG. 2 shows seismic data in accordance with one or more embodiments. FIG. 2 shows a portion of a seismic dataset known as a shot gather (200). A shot gather includes a plurality of seismic traces (206) generated by the activation of a single seismic source (106) recorded by a plurality of seismic receivers (120) each at a different receiver location. A single seismic trace (206) depicts the first arriving event (208) at a first arrival (210). The first arrival (210) represents the arrival time of the first seismic wave that is detected at a receiver. Each seismic trace (206) in the shot gather (200) runs vertically on an ordinate axis (204) indicating the time of seismic reflections. Each seismic trace (206) is displayed at a position on the horizontal axis (202) corresponding to the horizontal location of the seismic receiver (120) that recorded the seismic trace (206). The seismic dataset for a subterranean region of interest may be sorted into a plurality of shot gathers (200) consisting of a plurality of spatially-ordered seismic traces (206) for the method given in this disclosure.

FIGS. 3A and 3B show seismic gathers in accordance with one or more embodiments. FIG. 3A depicts a shot gather, previously described by FIG. 2. To illustrate certain aspects of this disclosure most effectively, the shot gather depicted in FIG. 3A was modelled or simulated using a seismic modeling procedure and noise was added to the resulting synthetic data. A modelled seismic dataset may be simulated by solving a wave equation, such as the acoustic, elastic, or viscoelastic wave equation, for at least one simulated seismic source location and a plurality of seismic receiver locations. In this case, a seismic source is simulated from a single location and the simulated seismic wave is recorded on a plurality of receivers. The identification of the time at which the first simulated seismic wave is detected at the receivers is referred to as the "first arrival travel time" of the first arrival. First arrival picking may be performed on real recorded seismic data or modelled data and while modelled data is used in this disclosure, any real recorded seismic dataset may be used in accordance with one or more embodiments.

The seismic dataset may be sorted into a plurality of shot gathers (such as shot gather (300a) composed of a plurality of spatially-ordered seismic traces (such as seismic trace (206). A pilot (308) may be applied to a single shot gather (300a). The pilot (308) includes a position on each of the plurality of spatially-ordered seismic traces (206) on an ordinate axis (302) indicating the first arrival travel time of the first arrival. Each of the spatially-ordered seismic traces (206) are displayed at a position on the horizontal axis (304) corresponding to the horizontal location of the seismic receiver that recorded the seismic trace. A final set of first arrival picks (310) are also shown on the shot gather (300a). The set of final first arrival picks (310), determined in the manner disclosed herein, are shown here to illustrate the differences between an initial pilot (308) and the first arrival picks (310). The pilot (308) need not pass an accuracy metric to be used in the disclosed method, although using a smooth pilot (308) such as a constant travel time may be advantageous to perform the disclosed method.

FIG. 3B depicts a preconditioned gather (300b) consisting of a plurality of preconditioned traces in accordance with one or more embodiments. Creating the preconditioned gather (300b) includes shifting the plurality of spatially-ordered seismic traces on the shot gather (300a) along the ordinate axis (302) by a shift determined from the pilot (308). A window with a predetermined window length representing a specified increment along the ordinate axis (302) may be centered on the pilot (308) and the portion of the seismic traces lying within the window may be extracted to create the preconditioned gather (300b). The preconditioned gather (300b) may be created by flattening the portion of the shot gather (300a) lying within the window centered on the pilot (308). The preconditioned gather (300b) displays the seismic traces that were captured inside the predetermined window centered on the pilot (308) and displays the preconditioned traces against a lag time relative to the pilot (308), indicated on the axis (312).

Specifically, in FIG. 3B, a preconditioned gather (300b) has been created by extracting the seismic traces from the shot gather (FIG. 3A) using the pilot with a window length of 300 samples. The preconditioned gather in FIG. 3B expresses the seismic traces extracted from 150 samples above the pilot (308) and 150 samples below the pilot (308) indicated by an ordinate axis (312) and each preconditioned trace is displayed at a position on the horizontal axis (304) corresponding to the horizontal location of the seismic receiver that recorded the seismic trace. The seismic traces are displayed in normalized amplitudes, given by the grayscale (314). Using the preconditioned gather shown in FIG. 3B, global path tracing may be used subject to a constraint, to determine a differential pilot. Determining the differential pilot will be discussed in more detail in the context of FIG. 4.

Figure 4:
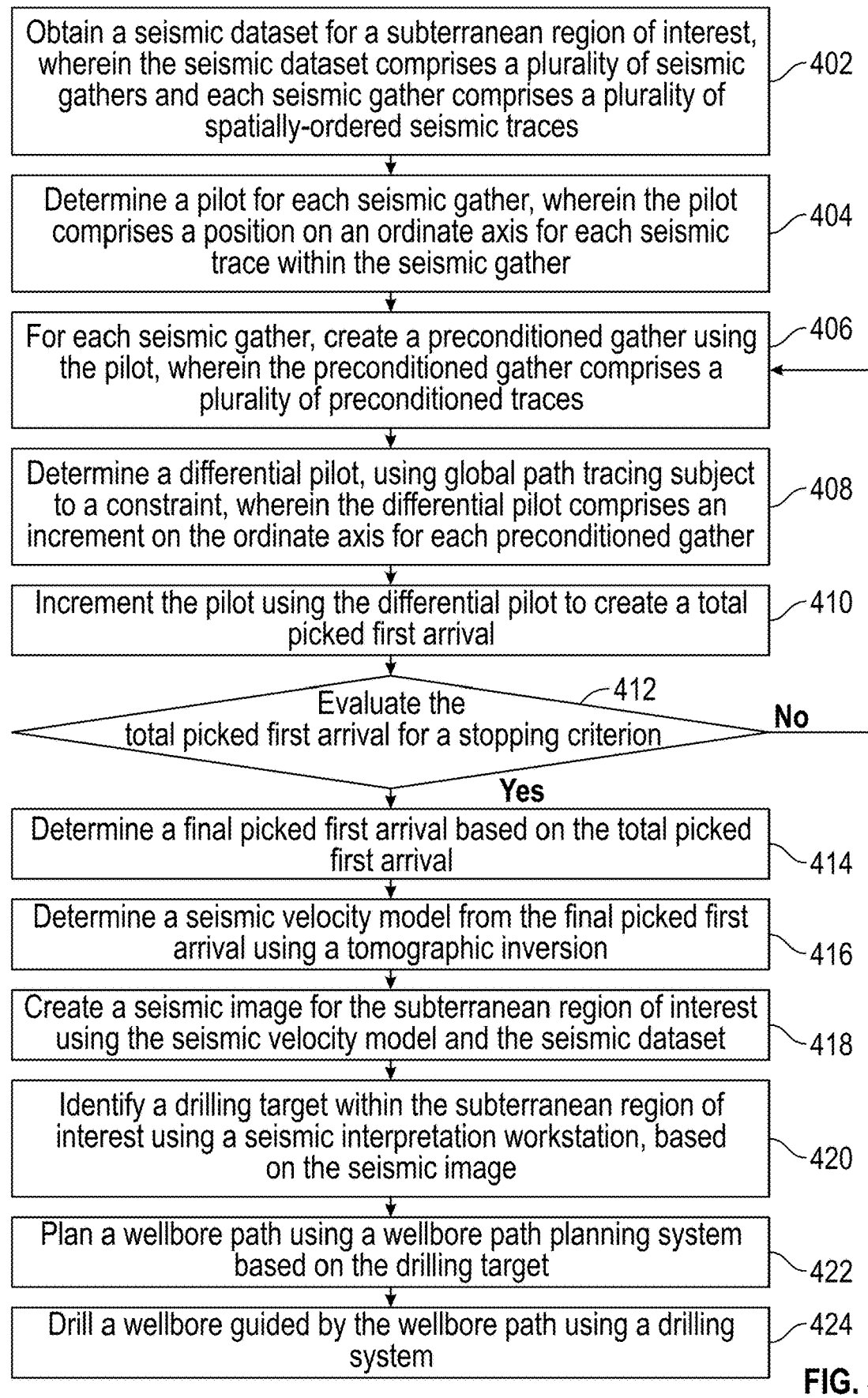
FIG. 4 shows a flowchart in accordance with one or more embodiments.

FIG. 4 shows a flowchart in accordance with one or more embodiments. The flowchart outlines a method to automatically determine a total picked first arrival for a seismic dataset for a subterranean region of interest. A seismic velocity model may be determined from the total picked first arrival using a tomographic inversion and a seismic image for a subterranean region of interest may be created based, at least in part, on the seismic velocity model and the seismic dataset. A drilling target may be identified within the subterranean region of interest based on the seismic image and a wellbore path may be planned, using a wellbore path planning system, to intersect the drilling target. A wellbore may be drilled guided by the wellbore path using a drilling system.

In Step 402, in accordance with one or more embodiments, a seismic dataset for a subterranean region of interest is obtained. The seismic dataset may include a plurality of seismic gathers and each seismic gather may be composed of a plurality of spatially-ordered seismic traces. The seismic gathers may be sorted into shot gathers, illustrated by FIGS. 2 and 3A. Further seismic processing steps may be performed on the seismic dataset, including noise attenuation in accordance with one or more embodiments. Noise attenuation may increase the signal to noise ratio (S/N) and may aid with the determination of first arrival picks.

In Step 404, in accordance with one or more embodiments, a pilot is determined for each seismic gather. The pilot is composed of an ordinate value, indicated on the ordinate axis, for each seismic trace within the seismic gather. In some embodiments, the ordinate axis indicates time. For clarity, when referring to the ordinate axis, we will use "time axis" or "time" when referring to a position on the ordinate axis. In some embodiments, the ordinate axis may also indicate a depth axis or a time lag axis.

The position of the pilot on the time axis indicates an estimate of the arrival time of the first arriving event or the first arrival. In some embodiments, the pilot may be a constant value, i.e., the same time value for each trace in the seismic gather, such as the pilot illustrated in FIG. 5A. In other embodiments, the pilot may be a smooth curve, varying smoothly over spatially-adjacent traces and may be determined from an initial seismic velocity model. The initial seismic velocity model may be generated from acoustic well logs or determined from the seismic dataset. The seismic velocity model may be obtained from a separate seismic dataset for the subterranean region of interest, or from a separate seismic dataset for an area approximate to the subterranean region of interest.

A smooth pilot is shown in FIG. 3A, applied to a single shot gather. The pilot may represent a rough estimate of the first arrivals in the seismic dataset and does not need to pass an accuracy metric to be used in this method. Traditional first arrival picking methods are dependent on having an accurate pilot that closely resembles the true first arrival picks of the seismic dataset. The method disclosed herein describes a first arrival picking method that avoids this reliability on the pilot. Avoiding reliability on the pilot may be advantageous for areas that have not been explored extensively, when legacy data is not available, and for areas of complex shallow subsurface geology.

A window of a predetermined length, representing a specified increment along the time axis, may be centered on the pilot. A window with a predetermined length of 300 samples is shown in FIG. 3B, i.e., the window spans 150 samples above, and 150 samples below, the pilot. The window is used to extract the seismic traces within that window to create a preconditioned gather, discussed further in Step 406. First arrivals usually increase rapidly from small to large offsets and that is demonstrated in FIG. 3A. It may be difficult however to ensure the smoothness of the total picked first arrivals, when a traveltime varies within a large range. To avoid this large variation and difficulty ensuring smoothness of the total picked first arrivals, a smooth pilot may be used demonstrated in FIG. 3A. A pilot may be auto picked by a computer program or manually picked by a user skilled in the arts. Any method familiar to one of ordinary skill in the art may be used to obtain the pilot without deviating from the scope of this disclosure, however the pilot is preferred to be smooth to avoid a large variation in traveltime versus offset.

In Step 406, in accordance with one or more embodiments, for each seismic gather, a preconditioned gather may be created using the pilot. The preconditioned gather may include a plurality of preconditioned traces. The plurality of preconditioned traces may be created from the preconditioned gather by shifting each preconditioned trace along the time axis by a shift determined from the corresponding value of the pilot for that trace. Step 406 begins the iterative loop, within which Steps 406-412 may be performed iteratively or recursively until a stopping criterion is met. In some embodiments, the stopping criterion may be a predetermined quality metric value for the total picked first arrival, as discussed further in the context of Step 412. In other embodiments, the stopping criterion may be the completion of a predetermined number of recursive loops.

In Step 408, in accordance with one or more embodiments, a differential pilot may be determined using global path tracing subject to a constraint. The differential pilot is an increment on the time axis to the pilot value for each trace in the preconditioned gather. The sum of the pilot and the differential pilot may provide a better estimate of the first arrival time than the pilot alone.

Performing global path tracing subject to a constraint requires the calculation of an accumulated amplitude along a plurality of global paths across the preconditioned gather. Each global path consists of one sample drawn from each preconditioned trace subject to the constraint. Global path tracing works in two steps, the first is calculating an accumulation of amplitude on every potential path and then backtracking an optimal path with the greatest accumulated amplitude with a strain factor for smoothness. The differential pilot is the backtracked optimal path in accordance with one or more embodiments.

Global path tracing is illustrated using a seismic dataset $D(x, t)$ that may contain an event, i.e., a wavelet on each trace having an amplitude larger than the ambient noise. A digitized version of $D(x, t)$ may be denoted $d(i,j)$, an $n \times m$ 2D array. To track this event, the principle of maximum accumulated amplitude is used to search the optimized path, which can be described as:

$$p_t(i) = \operatorname*{argmax}_{j} \sum_{i=0}^{n-1} d(i, j), \text{ where } 0 \leq j < m, \quad \text{Equation (1)}$$

subject to the constraint:

$$p_t(i) - p_t(i-1) \leq c. \quad \text{Equation (2)}$$

In equations (1) and (2) the variables i,j represent the indices of the trace and time sample, respectively. The differential pilot $p_t(i)$ is defined as the sample on the i-th trace that lies on the path across the array with the maximum summed amplitude. The constraint specifies a maximum separation on the time axis between candidate path samples on spatially-adjacent traces. The strain factor c controls the difference in the time of first arrivals on adjacent traces along the path, thus controlling the smoothness of traced global path.

The differential pilot for a preconditioned gather is given by the solution to equation (1) under the constraint defined by equation (2). Although the constraint guarantees a level of smoothness determined by the parameter c, in some embodiments additional smoothing may be applied to the differential pilot before its use in Step (410). The differential pilot is illustrated in FIG. 3B.

In Step 410, in accordance with one or more embodiments, the pilot is updated using the differential pilot to create a total picked first arrival. For example, the total picked first arrival, $p_o$, may be determined by:

$$p_o = p_p + p_t \quad \text{Equation (3)}$$

where $p_p$ denotes the pilot and $p_t$ denotes the differential pilot. The total picked first arrival $p_o$ describes the first arrivals that have been determined from the method within a current loop or iteration. Steps 406-412 highlight the portion of the method that is to be performed within the loop. The pilot $p_p$ introduced in Step 404 need not pass an accuracy metric, therefore it may be necessary to perform multiple iterations of Steps 406-412 to successfully converge the pilot to the observed first arrivals in the seismic dataset.

In Step 412, in accordance with one or more embodiments, the total picked first arrival may be evaluated for a stopping criterion. The total picked first arrival may be the solution to picking the observed first arrivals within a current loop or iteration for the seismic dataset. The total picked first arrival may be evaluated at Step 412 to determine the necessity of one or more additional loops. If the total picked first arrival from the current loop has not met the stopping criterion, the total picked first arrival may be used to replace the original pilot for an additional iteration. The updated pilot may be used to re-flatten the seismic gather to create a new set of preconditioned gathers described by Step 406. The global path tracing application may be repeated on the new preconditioned gathers to create the updated differential pilot and the updated total picked first arrival for the additional loop. The updated total picked first arrival may be evaluated at Step 412 once again for a stopping criterion.

In some embodiments the stopping criterion may include a predetermined total picked first arrival quality metric. In other embodiments the stopping criterion may include a differential pilot quality metric For example, the stopping criterion may include a comparison of an accumulated amplitude of the differential pilot, such as a maximum or mean amplitude, with a predetermined value. Alternatively, the stopping criterion may include a comparison of an accumulated amplitude of the current differential pilot with the accumulated amplitude of the previous differential pilot. The stopping criterion may also include reaching a predetermined minimum difference of accumulated amplitude of two differential pilots from adjacent iterations or reaching a predetermined minimum difference of total travel time from two adjacent iterations. The stopping criterion may further include reaching a maximum number of iterations or a maximum computation cost. Any method may be used to evaluate either the total picked first arrivals or the differential pilot for a stopping criterion without deviating from the scope of this disclosure.

In Step 414, in accordance with one or more embodiments, a final picked first arrival may be determined based on the total picked first arrival. Once the stopping criterion described by Step 412 has been satisfied, the total picked first arrival from the current and final iteration may be output and saved as the final picked first arrival. The final picked first arrival may be determined by a single iteration described by Steps 406-412 or from numerous iterations dependent on the satisfaction of the stopping criterion.

In Step 416, in accordance with one or more embodiments, a seismic velocity model may be determined from the final picked first arrivals. For example, the seismic velocity model may be determined using a tomographic inversion. Tomographic inversion inverts a seismic dataset to find a subsurface velocity structure beneath the location at which the seismic dataset was measured. Typically, tomographic inversion starts from an initial seismic velocity model and calculates simulated first arrivals. Further, tomographic inversion incrementally modifies the seismic velocity model such that the misfits between the final picked first arrivals and the simulated first arrivals are reduced. Tomographic inversion may include several iterations each including an update to the seismic velocity model, re-simulating the first arrival travel times, and comparison of the re-simulated first arrival travel times with the final picked first arrival travel time. When the misfit decreases to an acceptable level, based on a predetermined misfit criterion, the iteration of tomographic inversion may be deemed to have converged and the corresponding seismic velocity model is deemed to be an accurate representation of the seismic velocity in the subterranean region.

In some embodiments, the simulated first arrival travel times may be calculated from the seismic velocity model using numerical methods such as ray tracing methods, including ray shooting methods and two-point ray tracing methods. In other embodiments, the simulated first arrival travel times may be calculated using finite difference solutions to the eikonal equation on a gridded representation of the subterranean region.

In Step 418, in accordance with one or more embodiments, a seismic image may be created for the subterranean region of interest from the seismic dataset and the seismic velocity model determined in Step 416. The seismic image may be created using seismic migration using the updated seismic velocity model to position seismic reflectors at their true subsurface positions within the subterranean region of interest. Further, the migration using the updated seismic velocity model improves the accuracy of the seismic image in comparison to the seismic image achieved using the initial seismic velocity model, thus making seismic interpretation easier and more precise.

In the embodiments described in Steps 402-418, a computer system may be specifically configured for the seismic processing and denoted a seismic processor or a seismic processing system. The seismic image created using the seismic processor may aid in decisions as to where and if to drill for hydrocarbons based on the seismic interpretation. A seismic interpretation workstation may be configured to accept the seismic image for seismic interpretation in accordance with one or more embodiments.

In Step 420, in accordance with one or more embodiments, a drilling target may be identified within the subterranean region of interest using a seismic interpretation workstation based, at least in part, on the seismic image. Using the seismic interpretation workstation, the seismic image may be interpreted to determine various characteristics of the subterranean region of interest pertinent to the drilling of a well including determining drilling hazards, seismic facies, or a drilling target. The drilling target may be a targeted hydrocarbon bearing formation. Seismic facies are groups of seismic reflections in the seismic image that can be categorized based on characteristics such as amplitude, amplitude variation with offset/angle, continuity, frequency, and internal velocity. The classification of seismic facies is important for reservoir characterization. A drilling target may be identified by interpreting the seismic image to determine an advantageous entry point for a wellbore to penetrate a hydrocarbon reservoir. The drilling target may also be determined to avoid any potential drilling hazards which may also be interpreted from the seismic image using the seismic interpretation workstation.

In Step 422, in accordance with one or more embodiments, a wellbore path may be planned using a wellbore path planning system to intersect the drilling target. Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the drilling target and a planned wellbore path from the starting location to the terminal location.

The wellbore path planning system may include one or more computer processors in communication with computer memory containing the drilling target information, information relating to drilling hazards, and the constraints imposed by the limitations of the drillstring and the drilling system. The wellbore path planning system may further include dedicated software to determine the planned wellbore path and associated drilling parameters, such as the planned wellbore diameter, the location of planned changes of the wellbore diameter, the planned depths at which casing will be inserted to support the wellbore and to prevent formation fluids entering the wellbore, and the drilling mud weights (densities) and types that may be used during drilling the wellbore. A wellbore path planning system is illustrated and given in more detail in FIG. 6.

In Step 424, in accordance with one or more embodiments, a wellbore guided by the wellbore path may be drilled using a drilling system. A wellbore may be drilled by a drill bit, attached by a drillstring, to a drill rig which are all included in a drilling system. The wellbore may traverse a plurality of overburden layers to a drilling target within a hydrocarbon reservoir. The drilling target may be identified based on the seismic image, described in Step 420. The seismic image created using the method outlined in the current disclosure, may lead to advantageous subterranean interpretation and the determination of a drilling target including a hydrocarbon reservoir. A drilling system may be used to drill a wellbore, guided by the wellbore path to access and extract these hydrocarbons. A drilling system is illustrated and given in more detail in FIG. 6.

Figure 5A:
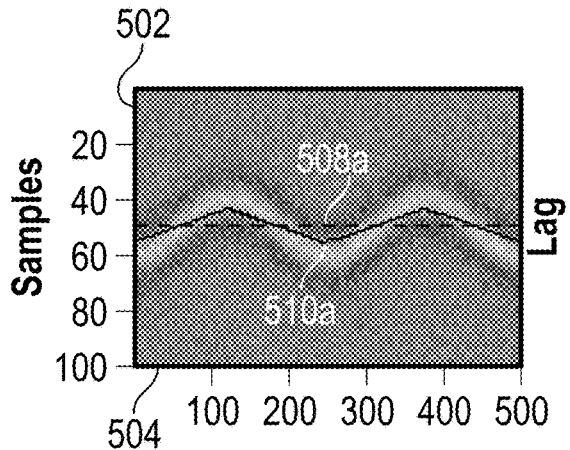
FIGS. 5A-5F show seismic gathers in accordance with one or more embodiments.
Figure 5B:
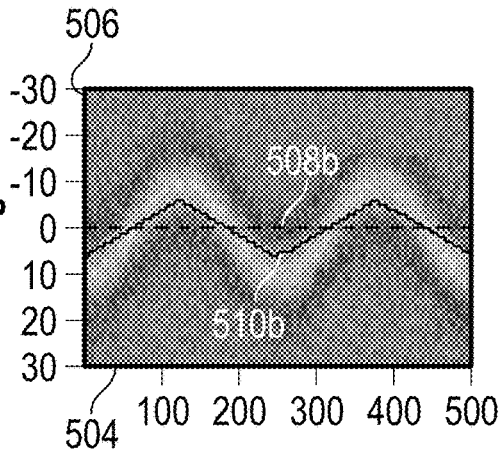
Figure 5C:
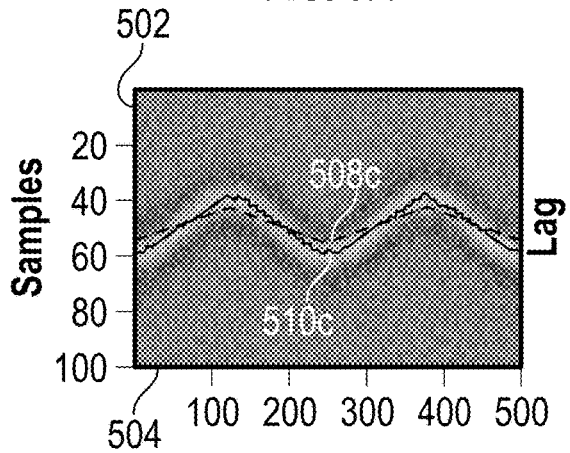
Figure 5D:
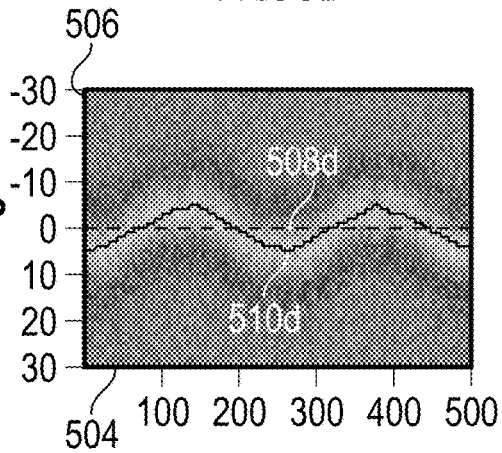
Figure 5E:
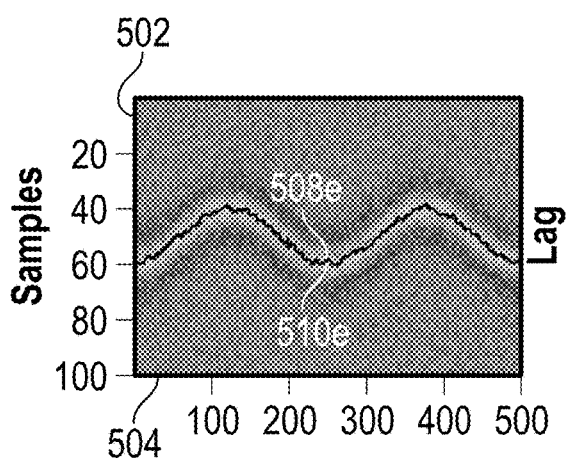

FIGS. 5A-5F show three iterations of the method to determine a final picked first arrival in accordance with one or more embodiments. FIGS. 5A, 5C and 5E show shot gathers. The shot gathers consist of a plurality of spatially-ordered seismic traces on a time axis (502), indicating the arrival time of the first arrival. Each of the spatially-ordered seismic traces are displayed at a position on the horizontal axis (504) corresponding to the horizontal location of the seismic receiver that recorded the seismic trace. Each shot gather represents a successive iteration of the method, where FIG. 5A shows the first iteration, FIG. 5C shows the second iteration, and FIG. 5E shows the third and final iteration that produces the final picked first arrivals. A sinusoidal model is used to evaluate the effectiveness of the method and is presented with a high level of random noise in FIGS. 5A, 5B, and 5C. This synthetic sinusoidal data is composed of 500 traces and 100 time samples per trace. The initial pilot (508a) for a first iteration is shown in FIG. 5A and was created by plotting a constant traveltime on each of the synthetic traces. This constant traveltime pilot demonstrates the effectiveness of the method when using a smoothed constant pilot containing inaccuracies. The predetermined window used in FIG. 5A has a length of 60 samples, so the seismic traces within 30 samples above and below the initial pilot (508a) will be extracted to a preconditioned gather (FIG. 5B).

Figure 5F:
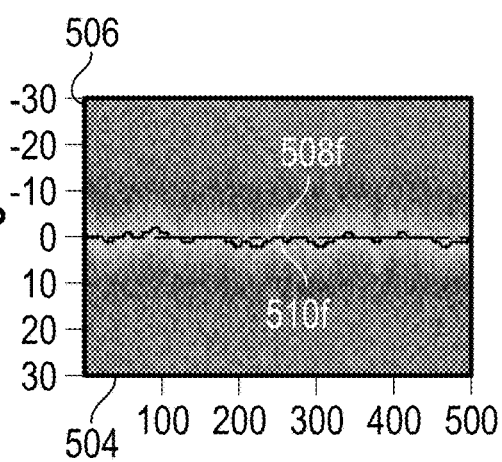

FIGS. 5B, 5D and 5F show a preconditioned gather, consisting of a plurality of preconditioned traces. Forming a preconditioned gather, from the pilot was given by Step 406. The preconditioned gathers (5B, 5D and 5F) display the seismic traces that were captured inside the predetermined window centered on the pilot and expressed as a lag time from the pilot centered at zero indicated by a time axis (506). Each preconditioned trace is displayed at a position on the horizontal axis (504) corresponding to the horizontal location of the seismic receiver that recorded the seismic trace. The seismic traces is expressed in normalized amplitude, given by the grayscale (512). Using the preconditioned gather shown in FIG. 3B, global path tracing may be used subject to a constraint, to determine a differential pilot. Determining the differential pilot will be discussed in more detail in the context of FIG. 4.

The pilot is shown on all three iterations on the shot gather (508a, 508c, 508e) and given at lag time zero on the preconditioned gathers (508b, 508d, 508f). The path of maximum accumulated amplitude or the differential pilots (510a-510f) are given in each of the gathers. The differential pilot may be determined using global path tracing subject to a constraint described by Step 408. A strain factor of 1 time sample was used to determine the differential pilots (510a-510f) in this example.

As the images progress in iterations, it is noticeable that the pilot begins to converge to the differential pilot. FIG. 5F shows a very close convergence between the iteration 3 pilot (508f) and the differential pilot (510f). This close convergence suggests that the method to obtain a final first arrival has successfully converged on an accurate solution starting from a smooth pilot created from a constant traveltime. The images in FIGS. 5A-5F demonstrate the methods ability to determine accurate first arrival picks without having to rely on an accurate initial pilot, which is often difficult to obtain in seismic data processing. With an accurate final picked first arrival, a seismic velocity model may then be determined using a tomographic inversion and a seismic image for the subterranean region of interest may be created using the seismic velocity model and the seismic dataset. The method further includes identifying a drilling target within the subterranean region of interest using a seismic interpretation workstation based, at least in part, on the seismic image. A wellbore path may be planned using a wellbore path planning system to intersect the drilling target, and a wellbore guided by the wellbore path may be drilled using a drilling system in accordance with one or more embodiments.

Figure 6:
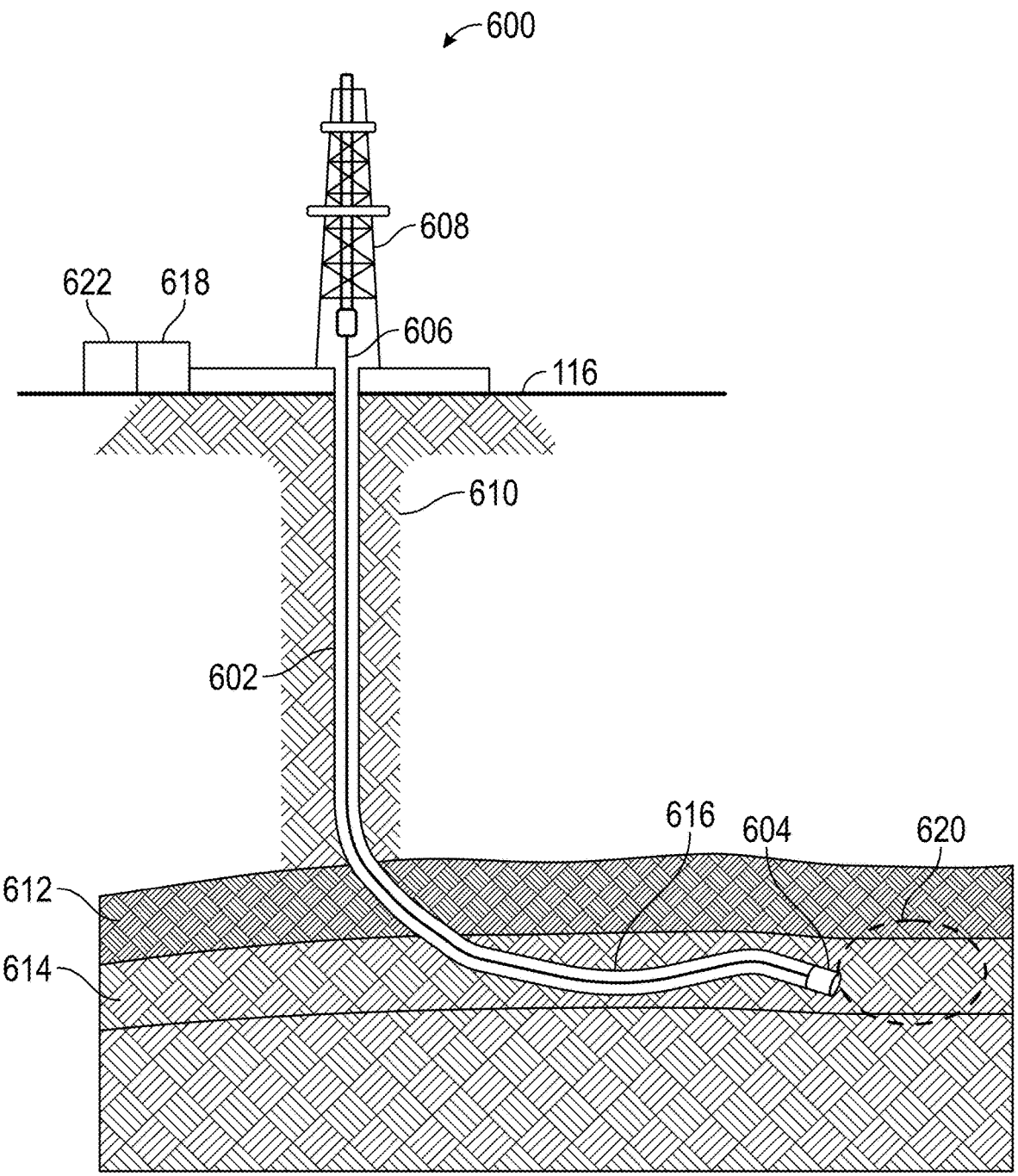
FIG. 6 shows a system in accordance with one or more embodiments.

FIG. 6 depicts a drilling system (600) in accordance with one or more embodiments. As shown in FIG. 6, a well path (602) may be drilled by a drill bit (604) attached by a drillstring (606) to a drill rig (608) located on the surface of the Earth (116). The well may traverse a plurality of overburden layers (610) and one or more cap-rock layers (612) to a drilling target (620) within a hydrocarbon reservoir (614). The well path (602) may be a curved well path, or a straight well path. All or part of the well path (602) may be vertical, and some well paths may be deviated or have horizontal sections.

Prior to the commencement of drilling, the seismic image may be interpreted using the seismic interpretation workstation (622) to determine a drilling target (620) based on the seismic image. The seismic interpretation workstation (622) may include a software platform configured to accept multiple types of data including well logs, seismic images, seismic velocity models and geological models. The software platform may aggregate the data from these systems to determine the subsurface location of a drilling target (620). The seismic interpretation workstation (622) may allow a seismic interpreter to manually manipulate the seismic image to identify and label subterranean features such as subterranean boundaries, faults, anticlines and a hydrocarbon reservoir (614). The seismic interpretation workstation (622) may also produce a geophysical model of the subsurface configured for a wellbore path planning system (618).

A wellbore plan may be generated using the wellbore path planning system (618). Typically, the wellbore plan is generated based on best available information from a geophysical model associated with the geo-physical properties of the subsurface (e.g., wave speed or velocity, density, attenuation, anisotropy), geomechanical models encapsulating subterranean stress conditions, the trajectory of any existing wellbores (which it may be desirable to avoid), and the existence of other drilling hazards, such as shallow gas pockets, over-pressure zones, and active fault planes. The geophysical model may be determined by the seismic interpretation workstation (622) in accordance with one or more embodiments.

Furthermore, the wellbore plan may take into account other engineering constraints such as the maximum wellbore curvature ("dog-log") that the drillstring may tolerate and the maximum torque and drag values that the drilling system may tolerate. In some embodiments, a wellbore path planning system (618) may be used to generate the wellbore plan based on the drilling target (620) and an advantageous wellbore path to the drilling target (620) to extract hydrocarbons. While the seismic interpretation workstation (622) and the wellbore path planning system (618) are shown at the drilling location, in some embodiments, the seismic interpretation workstation (622) and the wellbore path planning system (618) may be remote from a well site.

Figure 7:
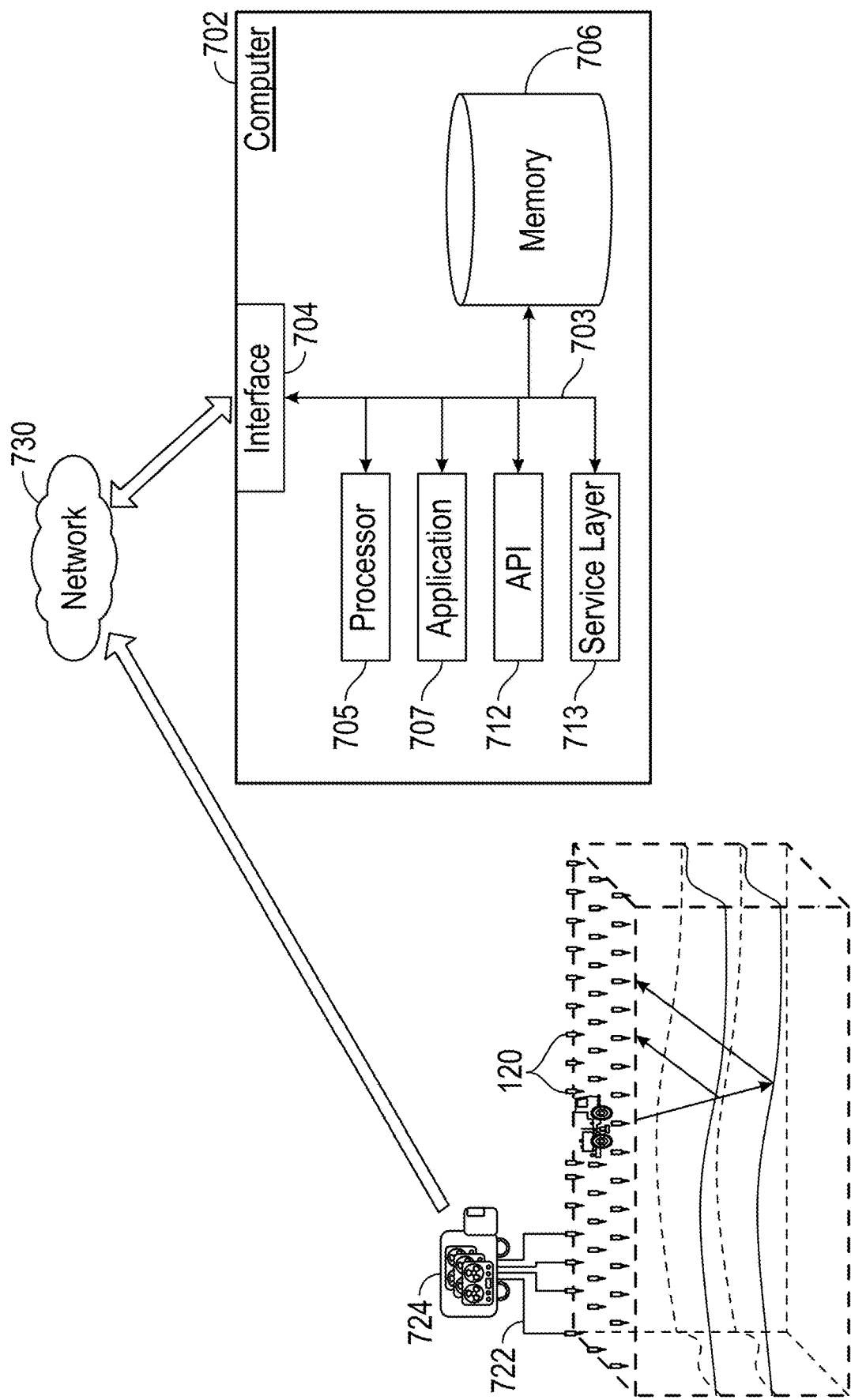
FIG. 7 shows a system in accordance with one or more embodiments.

FIG. 7 shows a seismic recording and processing system in accordance with one or more embodiments. The data recorded by a plurality of seismic receivers (120) may be transmitted to a seismic recording facility (724) located in the vicinity of the seismic survey. The seismic recording facility (724) may be one or more seismic recording trucks. The plurality of seismic receivers (120) may be in digital or analogue telecommunication with the seismic recording facility (724). The telecommunication may be performed over telemetry channels (722) that may be electrical cables, such as coaxial cables, or may be performed wireless using wireless systems, such as Wi-Fi or Bluetooth. Digitization of the seismic data may be performed at each seismic receiver (120), or at the seismic recording facility (724), or at an intermediate telemetry node (not shown) between the seismic receiver (120) and the seismic recording facility (724).

The seismic data may be recorded at the seismic recording facility (724) and stored on non-transitory computer memory. The computer memory may be one or more computer hard-drives, or one or more computer memory tapes, or any other convenient computer memory media familiar to one skilled in the art. The seismic data may be transmitted to a computer (702) for processing. The computer (702) may be located in or near the seismic recording facility (724) or may be located at a remote location, that may be in another city, country, or continent. The seismic data may be transmitted from the seismic recording facility (724) to a computer (702) for processing. The transmission may occur over a network (730) that may be a local area network using an ethernet or Wi-Fi system, or alternatively the network (730) may be a wide area network using an internet or intranet service. Alternatively, seismic data may be transmitted over a network (730) using satellite communication networks. Most commonly, because of its size, seismic data may be transmitted by physically transporting the computer memory, such as computer tapes or hard drives, in which the seismic data is stored from the seismic recording facility (724) to the location of the computer (702) to be used for processing.

FIG. 7 further depicts a block diagram of a computer system (702) used to provide computational functionalities associated with described algorithms, methods, functions, processes, flows, and procedures as described in this disclosure, according to one or more embodiments. For example, the seismic interpretation workstation (622) and the wellbore path planning system (618) may be implemented using one or more computer systems such as that illustrated by computer system (702), as would be understood by those skilled in the art. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), and each computer (702) communicates over a network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
obtaining a seismic dataset for a subterranean region of interest, wherein the seismic dataset comprises a plurality of seismic gathers and each seismic gather comprises a plurality of spatially-ordered seismic traces;
determining a pilot for each seismic gather, wherein the pilot comprises a position on an ordinate axis for each seismic trace within the seismic gather;
for each seismic gather, iteratively or recursively, until a stopping criterion is met:
creating a preconditioned gather using the pilot, wherein the preconditioned gather comprises a plurality of preconditioned traces,
determining a differential pilot, using global path tracing subject to a constraint, wherein the differential pilot comprises an increment on the ordinate axis for each preconditioned gather, and
incrementing the pilot using the differential pilot to create a total picked first arrival;
determining a final picked first arrival based on the total picked first arrival;
determining a seismic velocity model from the final picked first arrival using a tomographic inversion; and
creating a seismic image for the subterranean region of interest using the seismic velocity model and the seismic dataset.

2. The method of claim 1, further comprising identifying, using a seismic interpretation workstation, a drilling target within the subterranean region of interest based, at least in part, on the seismic image.

3. The method of claim 2, further comprising planning a wellbore path using a wellbore path planning system to intersect the drilling target.

4. The method of claim 3, further comprising drilling a wellbore guided by the wellbore path using a drilling system.

5. The method of claim 1, wherein the stopping criterion comprises a predetermined total picked first arrival quality metric.

6. The method of claim 1, wherein creating the preconditioned gather comprises determining the plurality of preconditioned traces, wherein each preconditioned trace is generated by shifting one of the plurality of spatially-ordered seismic traces along the ordinate axis by a shift determined from the pilot.

7. The method of claim 1, wherein determining the differential pilot, using the global path tracing subject to the constraint comprises:
calculating an accumulated amplitude along a plurality of global paths across the preconditioned gather, wherein each global path comprises one sample drawn from each preconditioned trace subject to the constraint;
determining a path of maximum accumulated amplitude based on identifying the global path with a greatest accumulated amplitude; and
determining the differential pilot from a separation of the pilot and the path of maximum accumulated amplitude.

8. The method of claim 7, wherein the constraint specifies a maximum separation on the ordinate axis between candidate path samples on spatially-adjacent traces.

9. A non-transitory computer readable memory comprising computer-executable instructions stored thereon that, when executed on a processor, cause the processor to perform:
receiving a seismic dataset for a subterranean region of interest, wherein the seismic dataset comprises a plurality of seismic gathers and each seismic gather comprises a plurality of spatially-ordered seismic traces;
determining a pilot for each seismic gather, wherein the pilot comprises a position on an ordinate axis for each seismic trace within the seismic gather;
for each seismic gather, iteratively or recursively, until a stopping criterion is met:
creating a preconditioned gather using the pilot, wherein the preconditioned gather comprises a plurality of preconditioned traces,
determining a differential pilot, using global path tracing subject to a constraint, wherein the differential pilot comprises an increment on the ordinate axis for each preconditioned gather, and
incrementing the pilot using the differential pilot to create a total picked first arrival;
determining a final picked first arrival based on the total picked first arrival;
determining a seismic velocity model from the final picked first arrival using a tomographic inversion; and
creating a seismic image for the subterranean region of interest using the seismic velocity model and the seismic dataset.

10. The non-transitory computer readable memory of claim 9, wherein the ordinate axis indicates time.

11. The non-transitory computer readable memory of claim 9, wherein creating the preconditioned gather comprises determining the plurality of preconditioned traces, wherein each preconditioned trace is generated by shifting one of the plurality of spatially-ordered seismic traces along the ordinate axis by a shift determined from the pilot.

12. The non-transitory computer readable memory of claim 9, wherein determining the differential pilot, using the global path tracing subject to the constraint comprises:
calculating an accumulated amplitude along a plurality of global paths across the preconditioned gather, wherein each global path comprises one sample drawn from each preconditioned trace subject to the constraint;
determining a path of maximum accumulated amplitude based on identifying the global path with a greatest accumulated amplitude; and
determining the differential pilot from a separation of the pilot and the path of maximum accumulated amplitude.

13. The non-transitory computer readable memory of claim 12, wherein the constraint specifies a maximum separation on the ordinate axis between candidate path samples on spatially-adjacent traces.

14. A system, comprising:
a seismic survey system configured to acquire a seismic dataset for a subterranean region of interest, wherein the seismic dataset comprises a plurality of seismic gathers and each seismic gather comprises a plurality of spatially-ordered seismic traces; and
a seismic processor configured to:
receive the seismic dataset for the subterranean region of interest from the seismic survey system,
determine a pilot for each seismic gather, wherein the pilot comprises a position on an ordinate axis for each seismic trace within the seismic gather,
for each seismic gather, iteratively or recursively, until a stopping criterion is met:
create a preconditioned gather using the pilot, wherein the preconditioned gather comprises a plurality of preconditioned traces,
determine a differential pilot, using global path tracing subject to a constraint, wherein the differential pilot comprises an increment on the ordinate axis for each preconditioned gather,
increment the pilot using the differential pilot to create a total picked first arrival,
determine a final picked first arrival based on the total picked first arrival;
determine a seismic velocity model from the final picked first arrival using a tomographic inversion, and
create a seismic image for the subterranean region of interest using the seismic velocity model and the seismic dataset; and
a seismic interpretation workstation configured to identify a drilling target within the subterranean region of interest based, at least in part, on the seismic image.

15. The system of claim 14, further comprising a wellbore path planning system configured to plan a wellbore path to intersect the drilling target.

16. The system of claim 15, further comprising a drilling system to drill a wellbore guided by the wellbore path.

17. The system of claim 14, wherein the stopping criterion comprises a predetermined total picked first arrival quality metric.

18. The system of claim 14, wherein creating the preconditioned gather comprises determining the plurality of preconditioned traces, wherein each preconditioned trace is generated by shifting one of the plurality of spatially-ordered seismic traces along the ordinate axis by a shift determined from the pilot.

19. The system of claim 14, wherein determining the differential pilot using the global path tracing subject to the constraint comprises:
calculating an accumulated amplitude along a plurality of global paths across the preconditioned gather, wherein each global path comprises one sample drawn from each preconditioned trace subject to the constraint;
determining a path of maximum accumulated amplitude based on identifying the global path with a greatest accumulated amplitude; and
determining the differential pilot from a separation of the pilot and the path of maximum accumulated amplitude.

20. The system of claim 19, wherein the constraint specifies a maximum separation on the ordinate axis between candidate path samples on spatially-adjacent traces.

* * * * *